United States Patent [19]

Kanazawa

[11] Patent Number: 5,179,842
[45] Date of Patent: Jan. 19, 1993

[54] INVERTER CONTROLLED AIR CONDITIONER CAPABLE OF EFFECTIVELY REDUCING A RUSH CURRENT AT STARTING

[75] Inventor: Hidetoshi Kanazawa, Fuji, Japan

[73] Assignee: Kabushiki Kaisha Toshiba, Kawasaki, Japan

[21] Appl. No.: 889,988

[22] Filed: May 29, 1992

[30] Foreign Application Priority Data

May 31, 1991 [JP] Japan .................................. 3-129549

[51] Int. Cl.$^5$ .......................... H02P 1/00; F25B 49/00
[52] U.S. Cl. ..................................... 62/158; 62/230; 361/22; 318/778; 318/811; 417/45
[58] Field of Search ........................ 62/230, 231, 228.4, 62/158, 157; 318/778, 445, 434, 807, 811; 361/22, 31, 87; 417/45

[56] References Cited

U.S. PATENT DOCUMENTS

| | | | |
|---|---|---|---|
| 4,516,912 | 5/1985 | Leitgeb et al. | 417/45 |
| 4,709,292 | 11/1987 | Kuriyama et al. | 361/22 |
| 4,719,398 | 1/1988 | Paice | 318/778 |
| 4,735,058 | 4/1988 | Umezu et al. | 62/230 |

FOREIGN PATENT DOCUMENTS 62-126893 6/1987 Japan .

*Primary Examiner*—Harry B. Tanner
*Attorney, Agent, or Firm*—Cushman, Darby & Cushman

[57] ABSTRACT

This invention provides an inverter controlled air conditioner capable of employing a rush current preventing relay having a small capacitance, thereby decreasing the cost. An inverter circuit includes a rectifying circuit connected to an AC power supply, a smoothing capacitor connected to the output terminals of the rectifying circuit, and a switching circuit, connected to the two terminals of the capacitor, for outputting a voltage having a predetermined frequency upon performing switching. An auxiliary power supply circuit has a rectifying circuit connected to the AC power supply. A control section drives the switching circuit with an output from the rectifying circuit as the operation voltage. Relay drive circuits for receiving the output from the rectifying circuit as the operation voltage are connected to an electromagnetic contactor and a relay. When the air conditioner is started, the control section energizes the relay for a predetermined period of time $t_s$ through the relay drive circuits and thereafter energizes the electromagnetic contactor. Normally-open contacts of the electromagnetic contactor are connected between the AC power supply and the inverter circuit. The capacitor of the inverter circuit is connected to the output terminals of the rectifying circuit of the auxiliary power supply circuit through a resistor and normally-open contacts of the relay.

7 Claims, 6 Drawing Sheets

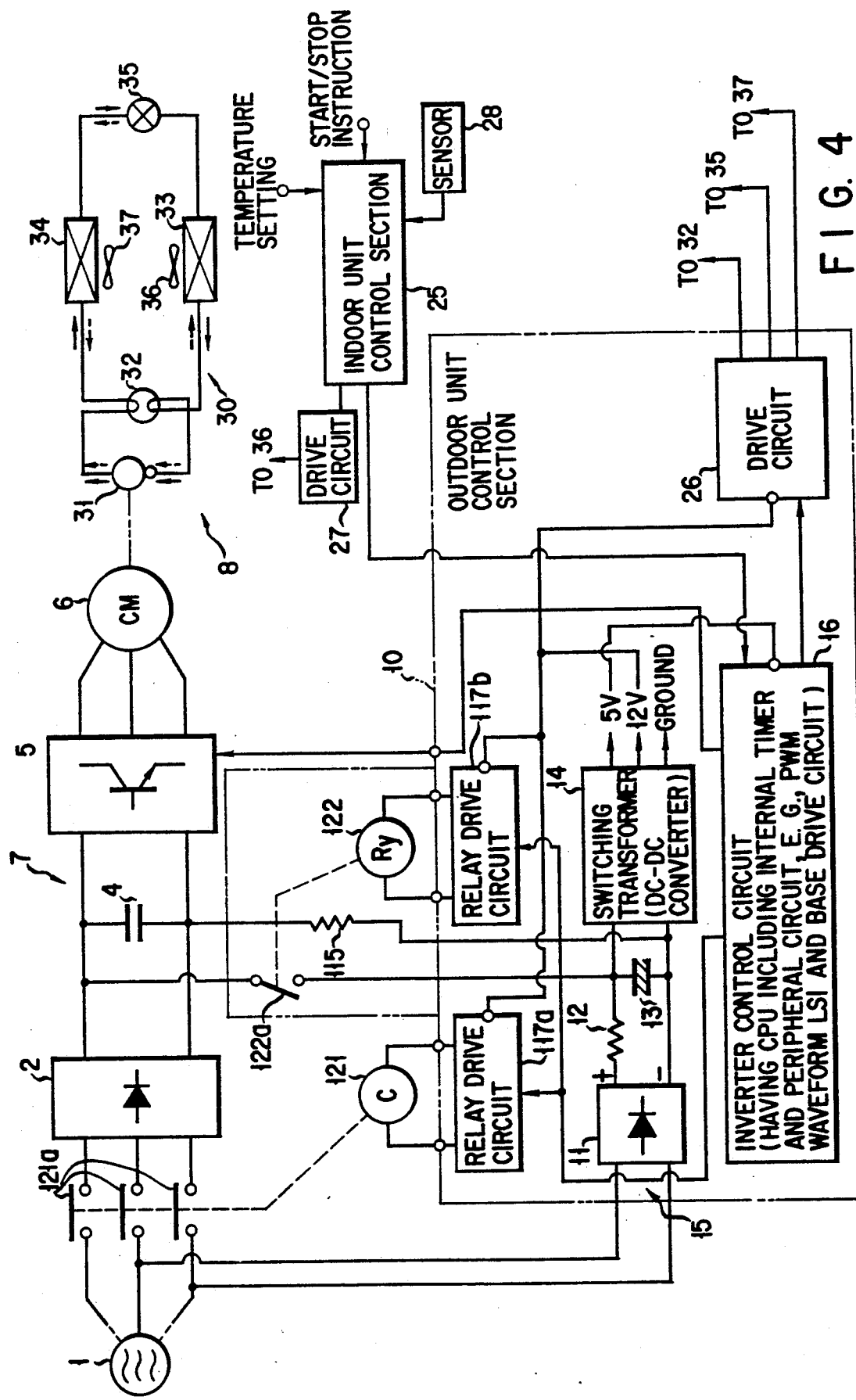
F I G. 4

INVERTER CONTROLLED AIR CONDITIONER CAPABLE OF EFFECTIVELY REDUCING A RUSH CURRENT AT STARTING

BACKGROUND OF THE INVENTION

1. Field of the Invention

The present invention generally relates to an inverter controlled air conditioner and, more particularly, to an inverter controlled air conditioner having an inverter control circuit for effectively reducing a rush current at starting.

2. Description of the Related Art

Some conventional air conditioners have a refrigerating cycle constituted by connecting a capability-variable compressor, a condenser, a pressure reducer, and an evaporator, and control the capability of the compressor in accordance with an air conditioning load in order to obtain an optimum capability corresponding to the air conditioning load, thereby improving the amenity and effect of energy conservation.

An air conditioner of this type has an inverter for driving a compressor motor and a control unit for controlling the inverter. FIG. 5 shows an arrangement of an inverter controlled air conditioner disclosed in Published Unexamined Japanese Patent Application No. 62-126893.

That is, the input terminals of a rectifying circuit 2 having a diode bridge are connected to the phases of a commercial three-phase AC power supply 1 through contactor contacts (normally-open contacts) 21a, and the output terminals of the rectifying circuit 2 are connected to a smoothing capacitor 4 through a parallel circuit of a resistor 3 and a relay contact 22a. A switching circuit 5 is connected to the two terminals of the smoothing capacitor 4, and the output terminals of the switching circuit 5 are connected to a compressor motor 6 for driving a compressor in an air conditioner body 8.

The resistor 3 serves to prevent a rush current from flowing in the smoothing capacitor 4 when the contactor contact 21a is closed to supply power. The relay contact 22a serves to form a short circuit for the resistor 3 when it is assured that no rush current flows.

The rectifying circuit 2, the smoothing capacitor 4, and the switching circuit 5 constitute an inverter 7.

The three-phase AC power supply 1 is also connected to a control section 10. The control section 10 is constituted by an auxiliary power supply circuit 15, an inverter control circuit 16, and relay drive circuits 17a and 17b. The auxiliary power supply circuit 15 comprises a rectifying circuit 11 for rectifying an AC voltage (line voltage) of the three-phase AC power supply 1, a smoothing capacitor 13 connected to an output terminal of the rectifying circuit 11 through a resistor 12, and a switching transformer (DC-DC converter) 14 connected to the two terminals of the capacitor 13. The inverter control circuit 16 comprises a CPU and peripheral circuits and obtains an operation voltage of 5V from the DC-DC converter 14 described above to control the inverter 7.

The relay drive circuits 17a and 17b of the control section 10 serve to selectively supply an operation voltage of 12V from the DC-DC converter 14 to an electromagnetic contactor 21 and a DC relay 22.

The function of the inverter controlled air conditioner shown in FIG. 5 will be described with reference to FIG. 6.

When a start command is input to the air conditioner body 8 as the drive target (YES in step S1), the electromagnetic contactor 21 is energized by the relay drive circuit 17a through the CPU in the inverter controlled circuit 16 (step S2), and the internal timer of the CPU starts counting t (step S3).

When the electromagnetic contactor 21 is energized, its contacts 21a are closed, and the voltage of the power supply 1 is applied to the inverter 7.

At this time, although a rush current is to flow to a main circuit starting from the rectifying circuit 2 and ended with the smoothing capacitor 4, it is decreased by the resistor 3. As a result, the smoothing capacitor 4 can be protected from a damage by the rush current at the starting.

When the timer count t of the internal timer of the CPU of the inverter control circuit 16 reaches a predetermined time $t_s$ (YES in step S4), the relay 22 is energized by the relay drive circuit 17b (step S5).

When the relay 22 is energized, the contact 22a is closed to short-circuit the resistor 3. Hence, a normal main circuit is formed, and the standby mode capable of driving the switching circuit 5 any time is set.

While no stop command is input to the air conditioner 8 (NO in step S6), if the operation ON state of the air conditioner body 8 is continued (YES in step S7), the switching circuit 5 is driven (step S8). More specifically, a voltage having a predetermined frequency is output from the switching circuit 5 to drive the compressor motor 6. Then, the air conditioner body 8 starts operation.

During the operation, if a stop command is input to the air conditioner body 8 (YES in step S9) or if an operation OFF command is output from the air conditioner body 8 (YES in step S6), the electromagnetic contactor 21 and the relay 22 are deenergized (steps S10 and S11). This sets the air conditioner body 8 in the stop mode.

In the inverter controlled air conditioner described above, a large current of about 30 A flows in the main circuit of the inverter 7 at starting. For this reason, the relay 22 and the resistor 3 both for preventing damages by the rush current need to have a large capacity, leading to an increase in cost.

In practice, since the relay 22 for preventing a rush current need to operate only when the inverter controlled air conditioner is started, it is operated only several times a day at maximum. Therefore, it is not preferable to employ a large-capacity, expensive relay as a relay which is not used very often in terms of cost performance.

SUMMARY OF THE INVENTION

It is, therefore, an object of the present invention to provide a new and improved inverter controlled air conditioner in which a relay having a small capacitance can be employed as a relay for preventing a rush current at starting in order to enable a large decrease in cost and to improve the cost performance.

According to the present invention, there is provided an inverter controlled air conditioner comprising:

an inverter including a rectifying circuit having AC input terminals and DC output terminals, a smoothing capacitor connected to the DC output terminals of the rectifying circuit, and a switching circuit, connected to two terminals of the smoothing capacitor, for outputting a signal having a predetermined frequency which is capable of being changed in accordance with a control signal;

a compressor motor driven by the signal having the predetermined frequency which is output from the switching circuit;

an electromagnetic contactor having normally-open contactor contacts connected between the AC input terminals of the rectifying circuit and an AC power supply, and an electromagnetic contactor body for energizing to close the contactor contacts in accordance with a drive signal;

an air conditioner body having a compressor driven by the compressor motor, a refrigerating cycle for circulating a refrigerant between outdoor and indoor heat exchangers by the compressor, and an indoor unit control section for outputting an operation command of the refrigerating cycle;

an outdoor unit control section having an auxiliary power supply circuit, connected to the AC power supply, for obtaining a plurality of DC operation voltages, first and second relay drive circuits to which the plurality of DC operation voltages are applied from the auxiliary power supply circuit, and an inverter control circuit, the inverter control circuit having control means for supplying the control signal to the inverter in response to an operation command from the indoor unit control section and controlling the first and second relay drive circuits to operate at predetermined timings, and the first relay drive circuit being connected to the electromagnetic contactor body to provide the drive signal when the air conditioner is started; and rush current preventing relay means having at least one normally-open contact connected between the two terminals of the smoothing capacitor of the inverter and a predetermined output terminal of the auxiliary power supply circuit, and a relay body for energizing to close the normally-open contact in accordance with a drive signal from the second relay drive circuit, wherein the control means of the inverter control circuit enables the second relay drive circuit upon reception of a start command from the indoor unit control section and thereafter enables the first relay drive circuit, so that the smoothing capacitor of the inverter is charged in advance by an operation voltage from the auxiliary power supply circuit and thereafter an AC power supply voltage from the AC power supply is applied to the inverter, thereby preventing a rush current from flowing to the smoothing capacitor when the inverter controlled air conditioner is started.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a view showing an arrangement of another modification of the embodiment shown in FIG. 1;

DETAILED DESCRIPTION OF THE PREFERRED EMBODIMENTS

Figure 1:
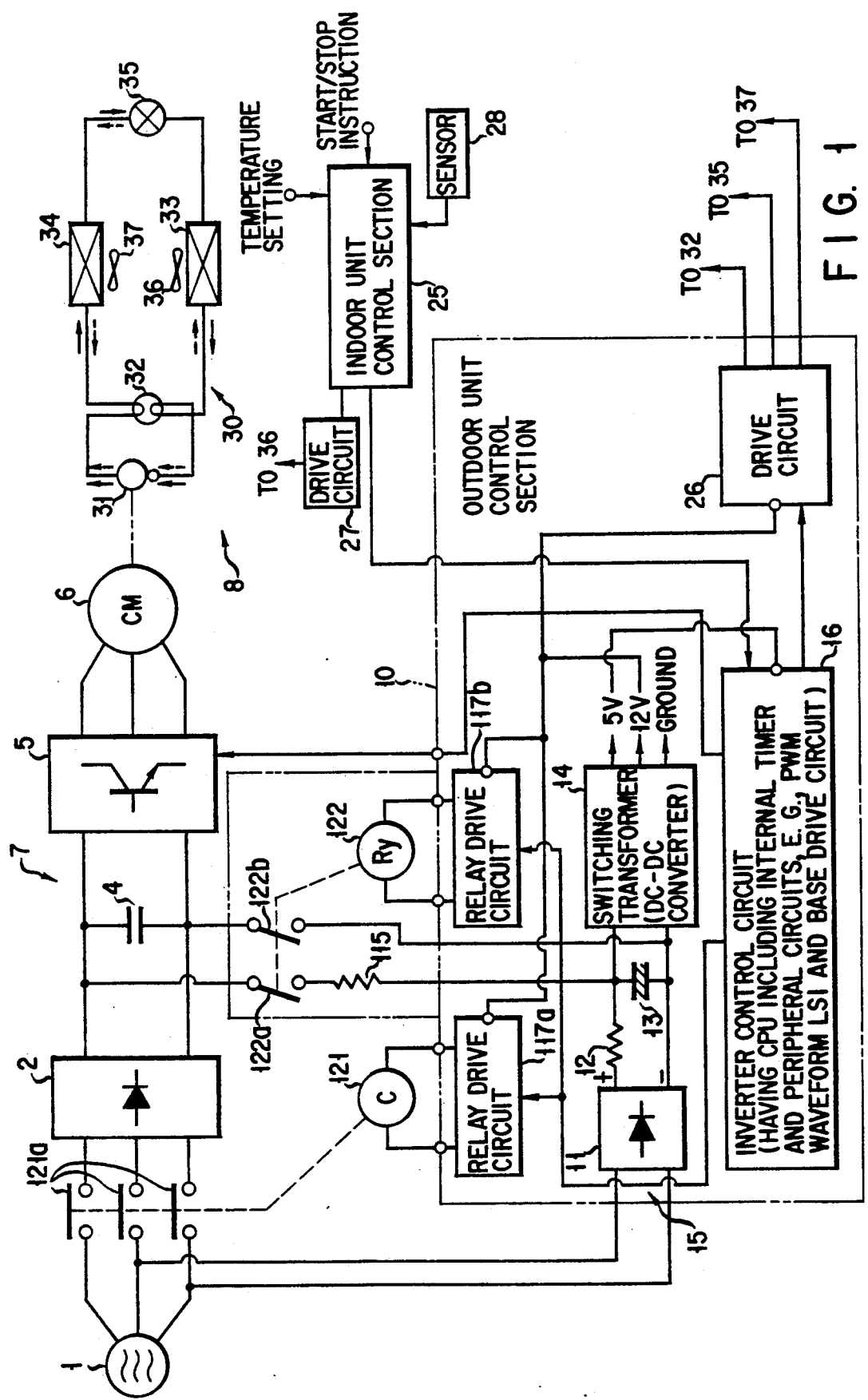
FIG. 1 is a view showing an arrangement of an inverter controlled air conditioner according to an embodiment of the present invention.

Reference will now be made in detail to the presently preferred embodiments of the invention as illustrated in the accompanying drawings, in which like reference characters designate like or corresponding parts throughout the several drawings.

Figure 5:
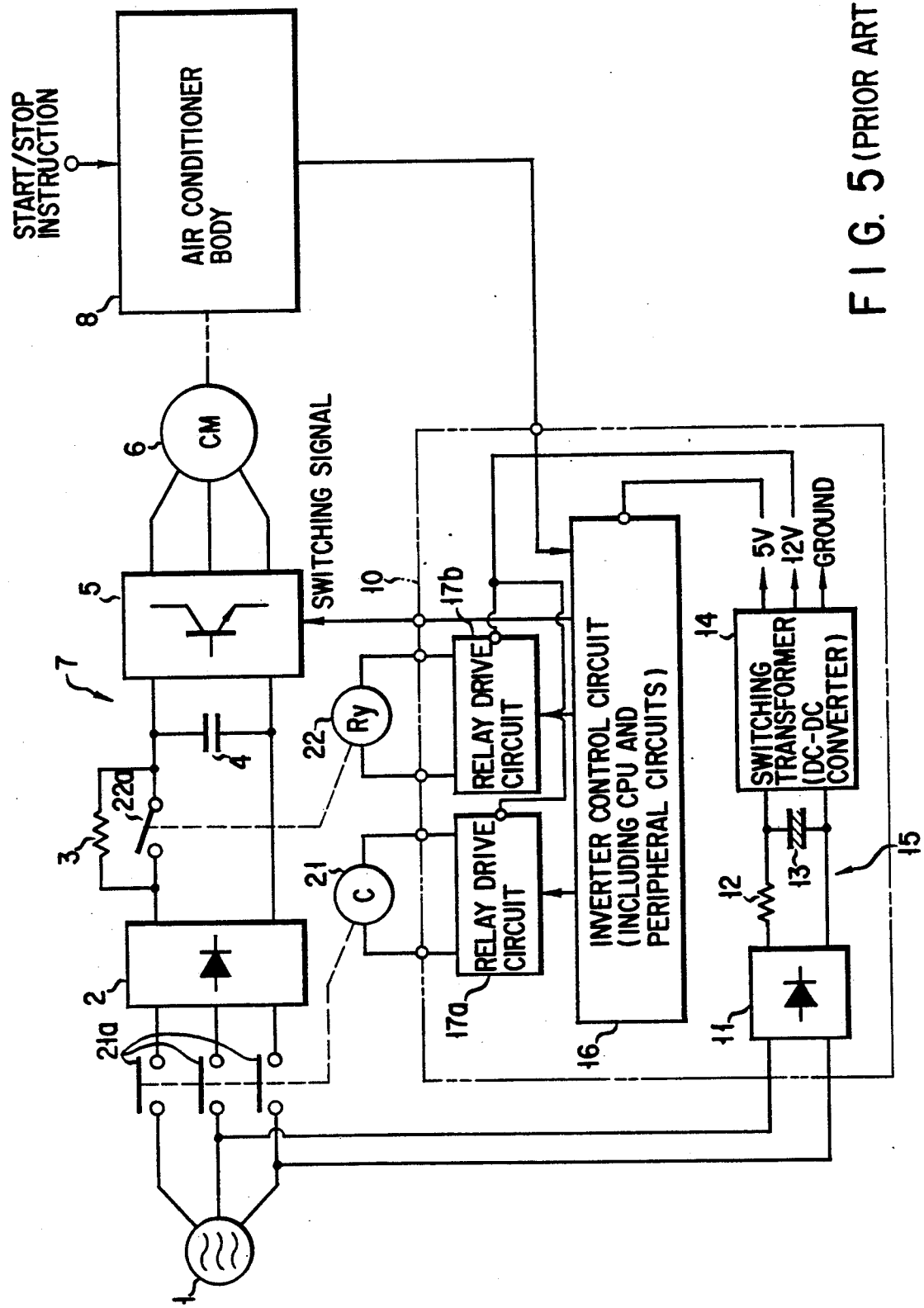
FIG. 5 is a view showing an arrangement of a conventional inverter controlled air conditioner.
Figure 6:
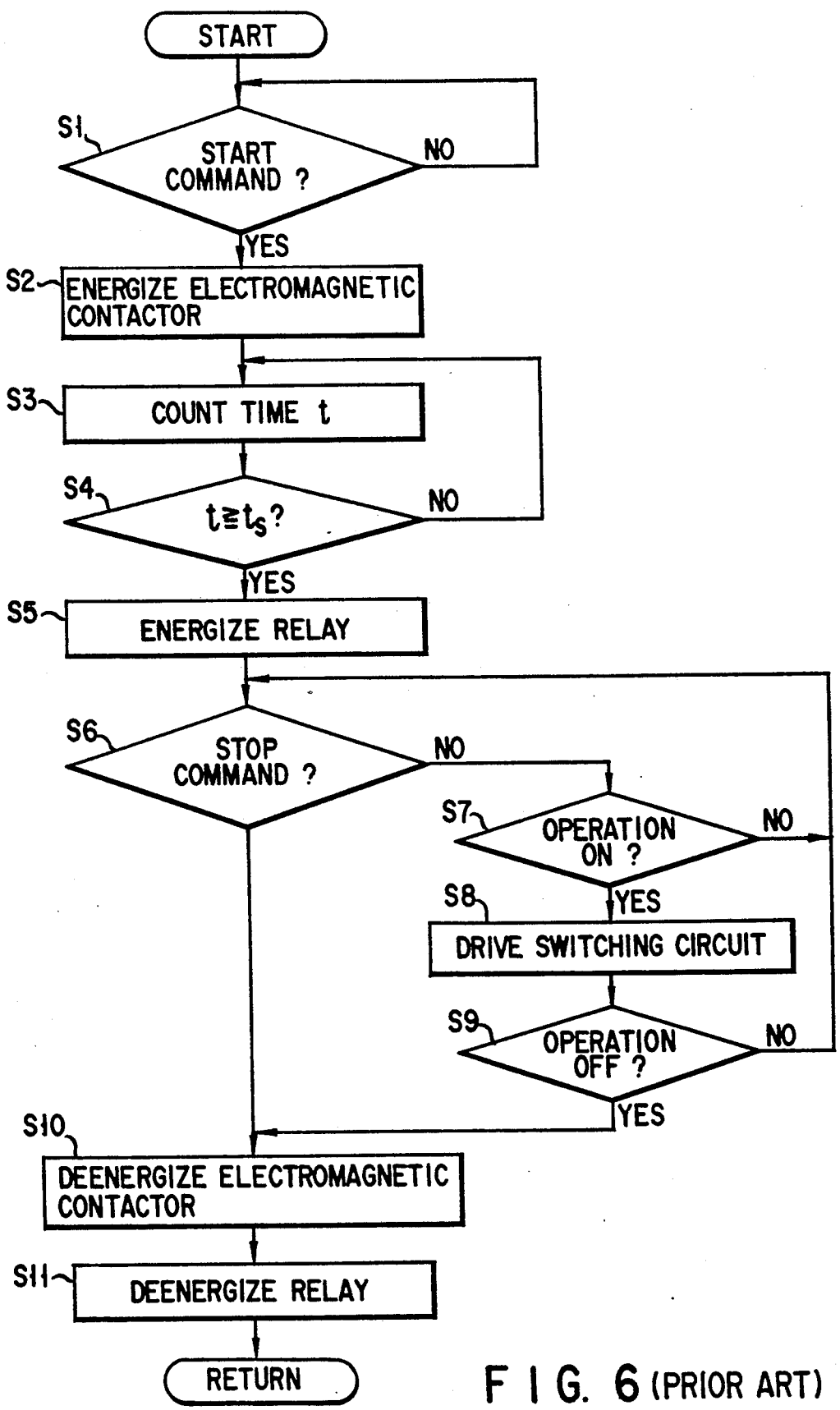
FIG. 6 is a flow chart for explaining the function of the conventional inverter controlled air conditioner.

An inverter controlled air conditioner according to an embodiment of the present invention will be described with reference to the accompanying drawings. Note that the same portions as in FIG. 5 are denoted by the same reference numerals, and a detailed description thereof will be omitted.

As shown in FIG. 1, a smoothing capacitor 4 is directly connected to the output terminals of a rectifying circuit 2. The positive terminal of the smoothing capacitor 4 is connected to the positive output terminal of a rectifying circuit 11 in an auxiliary power supply circuit 15 of an outdoor unit control section 10 through resistors 12 and 115 and a relay contact (normally-open contact) 122a. The negative terminal of the smoothing capacitor 4 is connected to the negative output terminal of the rectifying circuit 11 through a relay contact (normally-open contact) 122b.

The resistor 115 serves to drop the voltage.

An inverter control circuit 16 of the outdoor unit control section 10 comprises known PWM waveform LSI and base drive circuit, in addition to the CPU, in order to execute the following functions (1) and (2):

(1) A function of driving and stopping a switching circuit 5 in response to a start/stop command from an indoor control section 25 of the air conditioner as the drive target.

(2) A function of energizing a relay 122 for a predetermined of time upon reception of the start command and then energizing an electromagnetic contactor 121.

In a refrigerating cycle 30 constituting an air conditioner body 8, a four-way valve 32, indoor and outdoor heat exchangers 33 and 34, and an electronically controlled expansion valve 35 communicate with a capability-variable compressor 31 through a refrigerant pipe to constitute the heat pump type refrigerating cycle.

The indoor unit control section 25 drives an indoor fan 36 through a drive circuit 27. The outdoor unit control section 10 drives the four-way valve 32, the electronically controlled expansion valve 35, and an outdoor fan 37 through a drive circuit 26.

In the cooling operation mode, the refrigerant circulates in the direction of solid arrows in FIG. 1 (compressor 31→four-way valve 32→outdoor heat exchanger 34→electronically controlled expansion valve 35→indoor heat exchanger 33→four-way valve 32→compressor 31) and is evaporated in the indoor heat exchanger 33 to deprive the room to be air conditioned of latent heat of vaporization, thus performing the cooling function.

In the heating operation mode, the refrigerant flows in the direction of broken arrows in FIG. 1 (compressor 31 →four-way valve 32→indoor heat exchanger 33 →electronically controlled expansion valve 35→outdoor heat exchanger 34→four-way valve 32→compressor 31) and is condensed in the indoor heat exchanger 33 to dissipate heat in the room to be air conditioned, thereby performing the heating function.

Figure 2:
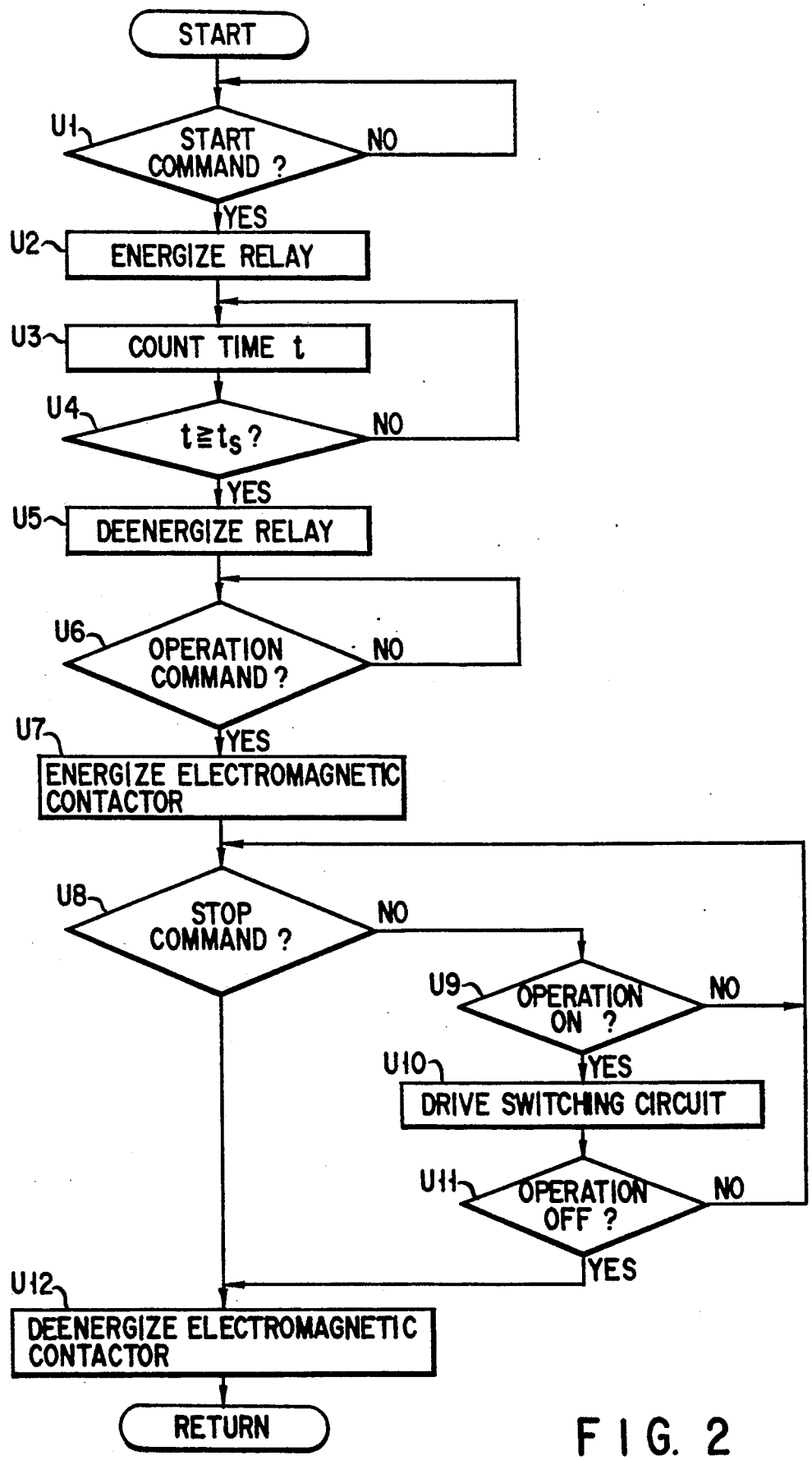
FIG. 2 is a flow chart for explaining the function of the embodiment shown in FIG. 1.

The operation of the inverter controlled air conditioner having the arrangement as described above will be described with reference to the flow chart of FIG. 2.

Normally, a three-phase AC power supply 1 is in the ON state, and its line voltage is applied to the input terminals of the auxiliary power supply circuit 15 of the outdoor unit control section 10. The applied voltage is rectified by the rectifying circuit 11, decreased by the resistor 12, smoothed by a smoothing capacitor 13, and converted to DC voltages of predetermined levels (5V and 12V) by a switching transformer (DC-DC converter) 14. Thus, the operation of the outdoor unit control section 10 is enabled.

In this state, when a start command is supplied from the indoor unit control section 25 (YES in step U1), the relay 122 is energized by the CPU in the inverter control circuit 16 through a relay drive circuit 117b (step U2), and the internal timer of the CPU starts counting time t (step U3).

When the relay 122 is energized, the contacts 122a and 122b are closed, and the output voltage from the rectifying circuit 11 is applied to the smoothing capacitor 4 of the inverter 7 through the resistors 12 and 115. The smoothing capacitor 4 is thus charged.

When the timer count t of the internal timer of the CPU reaches a predetermined time $t_s$ (YES in step U4), the relay 122 is deenergized (step U5).

That is, when charging of the smoothing capacitor 4 is completed, the output voltage from the auxiliary power supply circuit 15 is not applied to the smoothing capacitor 4, and the standby mode capable of driving the switching circuit 5 any time is set.

In this state, when a desired operation command based on comparison between a preset temperature value and an actual value of a room temperature sensor 28 is output from the indoor unit control section 25 (YES in step U6), the electromagnetic contactor 121 is energized by the CPU in the inverter control circuit 16 through a relay drive circuit 117a (step U7).

When the electromagnetic contactor 121 is energized, its contacts 121a are closed, and the voltage of the three-phase AC power supply 1 is applied to the inverter 7.

At this time, since the smoothing capacitor 4 is charged by the output voltage from the auxiliary power supply circuit 15, in advance, no rush current flows in the main circuit starting from the rectifying circuit 2 and ended with the smoothing capacitor 4, thereby protecting the smoothing capacitor 4 from a damage.

While no stop command is output from the indoor unit control section 25 (NO in step U8), if the operation command for the air conditioner body 8 is continued (YES in step U9), the switching circuit 5 is driven by the CPU in the inverter control circuit 16 through the PWM waveform LSI and the base drive circuit (step U10). That is, a voltage of a predetermined frequency corresponding to the given operation command is output from the switching circuit 5 to drive the compressor motor 6. Thus, the air conditioner body 8 is set in the operation mode.

During the operation, if a stop command is output from the indoor unit control section 25 (YES in step 11) or the operation command is canceled by the indoor unit control section 25 (YES in step U8), the electromagnetic contactor 121 is deenergized (step U12).

In this manner, since the smoothing capacitor 4 is charged in advance to prevent a rush current upon starting, the charging voltage is obtained from the operation voltage of the auxiliary power supply circuit 15 of the outdoor unit control section 10, and the charging path of the smoothing capacitor 4 is opened/closed by the relay 122. A relay having a small capacitance of about 1 suffices as the relay 122, leading to a reduction in cost. An inexpensive photocoupler type semiconductor switching element can be used in place of the relay 122. Since such small relay and switching element can be mounted on a printed circuit board on which the outdoor unit control section 10 is to be mounted, cost reduction is realized from this point of view.

Figure 3:
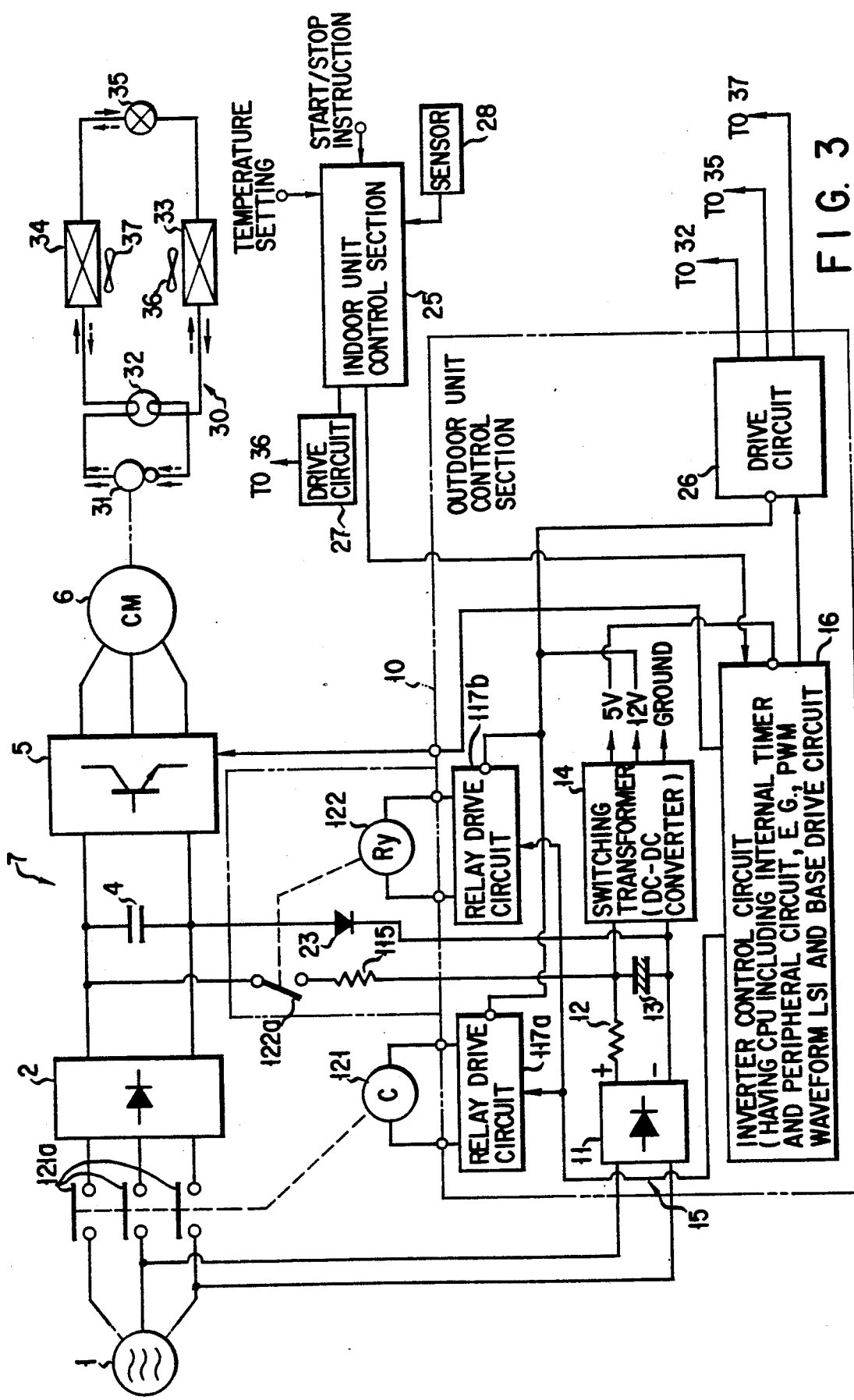
FIG. 3 is a view showing an arrangement of a modification of the embodiment shown in FIG. 1.

In this embodiment, the charging path for the smoothing capacitor 4 is formed by the two contacts 122a and 122b. However, it can be formed by one contact 122a and a diode 23, as shown in FIG. 3. Also, the contact 122b can be omitted if a voltage-drop resistor 115 is inserted in a path of a phase different to those of contacts 121a, as shown in FIG. 4.

In either case, when the air conditioner is started, the normally-open contact of the relay is closed, and the output voltage of the rectifying circuit of the auxiliary power supply circuit is applied to the smoothing capacitor 4 of the inverter 7 through the resistor to charge the smoothing capacitor 4. After the smoothing capacitor 4 is charged, the normally-open contact of the electromagnetic contactor is closed, and the inverter 7 is connected to the AC power supply.

As has been described above, according to the present invention, the smoothing capacitor of the inverter is charged in advance to prevent a rush current upon starting, the charging voltage is obtained from the operation voltage of the auxiliary power supply circuit of the outdoor unit control section, and the charging path of the smoothing capacitor is opened/closed by the relay. Therefore, an inverter controlled air conditioner capable of employing a relay having a small capacitance for preventing the rush current, thus leading to a reduction in cost, and capable of improving the cost performance can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An inverter controlled air conditioner comprising:
    an inverter including a rectifying circuit having AC input terminals and DC output terminals, a smoothing capacitor connected to said DC output terminals of said rectifying circuit, and a switching circuit, connected to two terminals of said smoothing capacitor, for outputting a signal having a predetermined frequency which is capable of being changed in accordance with a control signal;

a compressor motor driven by the signal having the predetermined frequency which is output from said switching circuit;

an electromagnetic contactor having normally-open contactor contacts connected between said AC input terminals of said rectifying circuit and an AC power supply, and an electromagnetic contactor body for energizing to close said contactor contacts in accordance with a drive signal;

an air conditioner body having a compressor driven by said compressor motor, a refrigerating cycle for circulating a refrigerant between outdoor and indoor heat exchangers by said compressor, and an indoor unit control section for outputting an operation command of said refrigerating cycle;

an outdoor unit control section having an auxiliary power supply circuit, connected to said AC power supply, for obtaining a plurality of DC operation voltages, first and second relay drive circuits to which said plurality of DC operation voltages are applied from said auxiliary power supply circuit, and an inverter control circuit, said inverter control circuit having control means for supplying the control signal to said inverter in response to an operation command from said indoor unit control section and controlling said first and second relay drive circuits to operate at predetermined timings, and said first relay drive circuit being connected to said electromagnetic contactor body to provide the drive signal when said air conditioner is started; and rush current preventing relay means having at least one normally-open contact connected between said two terminals of said smoothing capacitor of said inverter and a predetermined output terminal of said auxiliary power supply circuit, and a relay body for energizing to close said normally-open contact in accordance with a drive signal from said second relay drive circuit, wherein said control means of said inverter control circuit enables said second relay drive circuit upon reception of a start command from said indoor unit control section and thereafter enables said first relay drive circuit, so that said smoothing capacitor of said inverter is charged in advance by an operation voltage from said auxiliary power supply circuit and thereafter an AC power supply voltage from said AC power supply is applied to said inverter, thereby preventing a rush current from flowing to said smoothing capacitor when said inverter controlled air conditioner is started.

2. An air conditioner according to claim 1, wherein when said AC power supply is a three-phase AC power supply, said auxiliary power supply circuit of said outdoor unit control section includes a rectifying circuit for rectifying a line voltage of said three-phase AC power supply, a smoothing circuit for smoothing an output from said rectifying circuit, and a DC-DC converter for obtaining the plurality of DC voltages from an output from said smoothing circuit.

3. An air conditioner according to claim 1, wherein said inverter control circuit includes a CPU including an internal timer, and peripheral circuits such as a PWM waveform LSI and a base drive circuit.

4. An air conditioner according to claim 2, wherein said rush current preventing relay means includes a first normally-open contact connected between a positive output terminal of said smoothing circuit and one terminal of said smoothing capacitor of said inverter, and a second normally-open contact connected between a negative output terminal of said smoothing circuit and the other terminal of said smoothing capacitor of said inverter.

5. An air conditioner according to claim 2, wherein said rush current preventing relay means includes a normally-open contact connected between a positive output terminal of said smoothing circuit and one terminal of said smoothing capacitor of said inverter through a voltage-drop resistor, and a negative output terminal of said smoothing circuit and the other terminal of said smoothing capacitor of said inverter are coupled through a diode.

6. An air conditioner according to claim 2, wherein said rush current preventing relay means includes a normally-open contact connected between a positive output terminal of said smoothing circuit and one terminal of said smoothing capacitor of said inverter, and a negative output terminal of said smoothing circuit and the other terminal of said smoothing capacitor are coupled through a voltage-drop resistor.

7. An air conditioner according to claim 1, wherein said contact and said relay body of said rush current preventing relay means are both incorporated in said outdoor unit control section.

* * * * *